(12) United States Patent
Smith-Rose et al.

(10) Patent No.: US 12,536,433 B2
(45) Date of Patent: Jan. 27, 2026

(54) COMPUTER-BASED SYSTEMS CONFIGURED FOR CONTEXT-AWARE CALLER IDENTIFICATION AND METHODS OF USE THEREOF

(71) Applicant: Capital One Services, LLC, McLean, VA (US)

(72) Inventors: Asher Smith-Rose, Midlothian, VA (US); Lin Ni Lisa Cheng, New York, NY (US); Tyler Maiman, Melville, NY (US); Joshua Edwards, Philadelphia, PA (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 903 days.

(21) Appl. No.: 17/733,125

(22) Filed: Apr. 29, 2022

(65) Prior Publication Data

US 2023/0351171 A1    Nov. 2, 2023

(51) Int. Cl.
*G06N 3/08* (2023.01)
*H04M 3/42* (2006.01)

(52) U.S. Cl.
CPC .......... *G06N 3/08* (2013.01); *H04M 3/42042* (2013.01)

(58) Field of Classification Search
CPC ............................. H04M 3/42042; G06N 3/08

USPC ........................................................ 455/415
See application file for complete search history.

(56) References Cited

U.S. PATENT DOCUMENTS

| 10,750,013 B2 | 8/2020 | Cai et al. | |
| 2019/0141189 A1* | 5/2019 | Cai | H04M 3/42042 |
| 2022/0239773 A1* | 7/2022 | Garg | H04M 3/2218 |

* cited by examiner

*Primary Examiner* — Ahmad F. Matar
*Assistant Examiner* — Jirapon Tulop
(74) *Attorney, Agent, or Firm* — Greenberg Traurig, LLP

(57) ABSTRACT

Systems and methods of context-aware caller identification via machine learning techniques are disclosed. In one embodiment, an exemplary computer-implemented method may comprise: obtaining a trained call verification machine learning model that determines when a phone number is associated with a service provider that is associated with a delivery portion of a user activity with an entity within a time window; receiving, from a computing device of a first user, an indication of a communication being received from a second user; receiving activity information of a particular activity associated with the first user and a particular entity; utilizing the trained call verification machine learning model to determine, based at least in part on the activity information and the communication, that the second user is the particular service provider that is associated with a delivery portion of the particular activity associated with the particular entity.

20 Claims, 8 Drawing Sheets

COMPUTER-BASED SYSTEMS CONFIGURED FOR CONTEXT-AWARE CALLER IDENTIFICATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to curate additional caller information to enhance caller line identification information (e.g., caller ID), including, but not limited to, augmenting caller ID with callers' call-specific contextual information.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one exemplary technological problem exists when a caller's contextual information that is particular to a call and of interest to a call receiving party may be lacking or not be provided as part of the caller ID information identified by the phone number associated with the caller that may result in a shortcoming allowing for telecommunication security breach.

SUMMARY OF DESCRIBED SUBJECT MATTER

In some embodiments, the present disclosure provides various exemplary technically improved computer-implemented methods involving context-aware caller identification, the method including steps such as: obtaining, by one or more processors, a trained call verification machine learning model that determines when a phone number is associated with a service provider that is associated with a delivery portion of a user activity with an entity within a time window; receiving, by the one or more processors, from a computing device of a first user, a permission indicator identifying a permission by the first user to detect communications being received by the computing device; receiving, by the one or more processors, from the computing device, an indication of at least one communication being received from a second user, where the at least one communication is associated with a particular phone number; receiving, by the one or more processors, activity information of a particular activity associated with the first user and a particular entity, where the particular activity is to be delivered at a future point of time by a particular service provider; determining, by the one or more processors, a particular time window based at least in part on the indication of the at least one communication; utilizing, by the one or more processors, the trained call verification machine learning model to determine, based at least in part on the activity information and the indication of the at least one communication, that the second user is the particular service provider that is associated with a delivery portion of the particular activity associated with the particular entity; and instructing, by the one or more processors, when the second user is associated with the delivery portion of the particular activity and when the future point of time is within the particular time window, the computing device to display, to the first user, a graphical user interface (GUI) associated with the at least one communication, where the GUI includes at least one GUI element, notifying to the first user that the second user is associated with the delivery portion of the particular activity that is associated with the particular entity.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
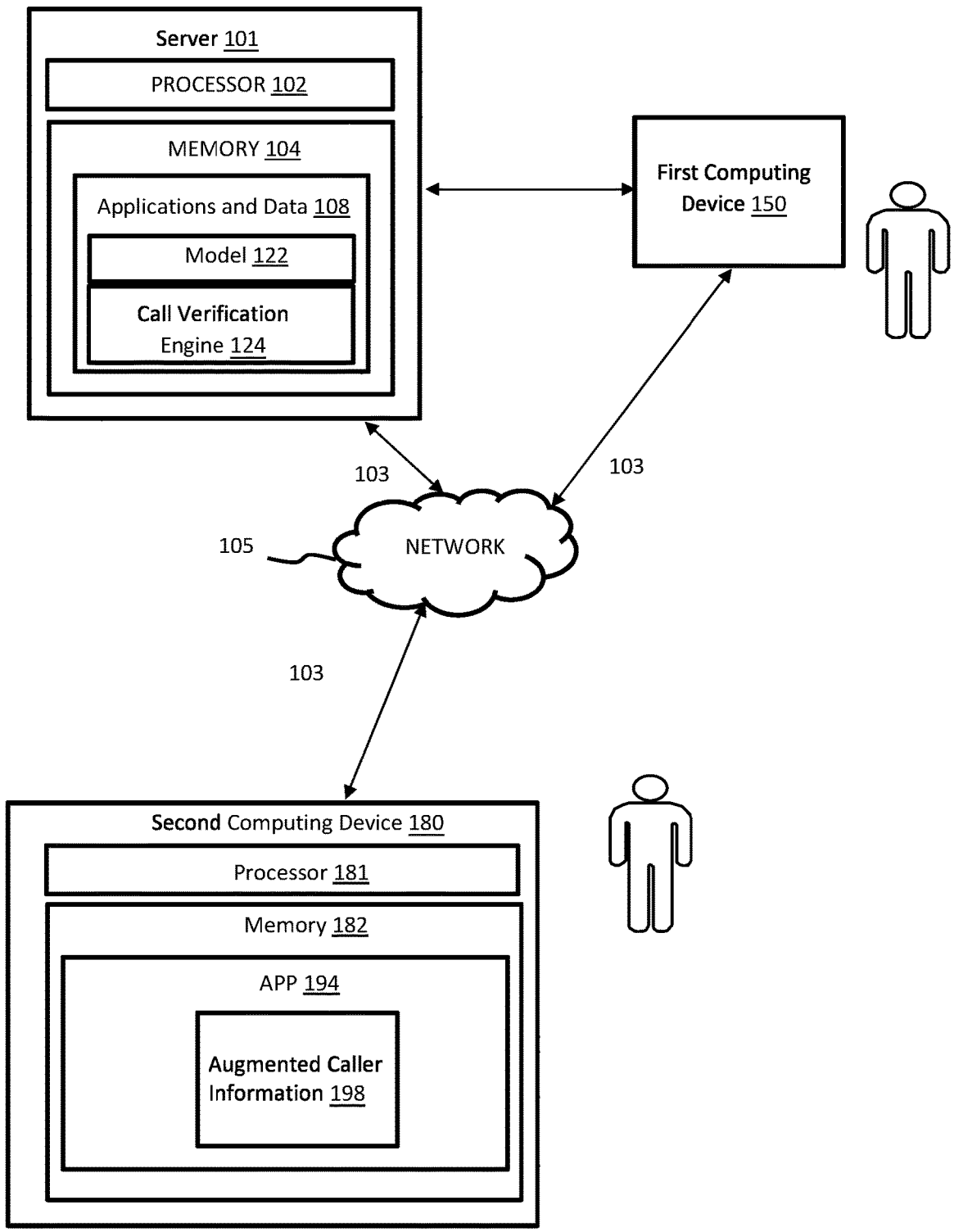
FIG. 1 is a block diagram of an exemplary system and/or platform illustrating aspects of context-aware caller identification, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the diversity of and intelligence gleaned from various communication events and at the same time to leverage advanced data processing capabilities, various embodiments of the present disclosure provide for improved computer-based platforms or systems, improved computing components and devices configured for one or more practical technological improvements involving: detecting phone calls received at computing devices of users, dynamically determining and displaying callers' call-specific contextual information to augment the caller ID information associated therewith, as well as generating intelligence (e.g., machine learning models, etc.) empowered by correlating various user transaction events with respective call events, service provider profile information and/or service provider contextual information, merchant profile information and/or merchant contextual information to, for example, automate the determination of a time window as well as the call-specific contextual information of a caller with enhanced efficiency, accuracy, relevancy, accessibility, and privacy control.

Various embodiments disclosed herein may be implemented in connection with one or more entities that provide, maintain, manage, and/or otherwise offer any services involving various transaction data and/or communication(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account known to those skilled in the art.

For example, a transaction account (e.g., credit card account debit card account, mobile pay account, loyalty point account, banking account, trading account, virtual credit card account, bitcoin account, etc.) of a user may be set up and updated in association with various respective user profile information such as, one or more mobile phone numbers of the user, a home address of the user, a work address of the user, and the like.

For purposes of illustration, data structures and/or operations specific to phone calls may be used herein as non-limiting examples to describe some embodiments of the present disclosure. Various aspects of various disclosed technological improvements may apply to communications at various modalities. For example, the contextual information may be used to augment record(s) associated with identification(s) of a user's (e.g., communication initiating user's), for example, email address, chatting account, social media account, and so on. Correspondingly, the contextual information may be dynamically displayed to another user in receipt of an incoming communication initiated by the user via various communication modalities. By way of non-limiting examples, such communications may be in the forms of an SMS, an MMS, an email, a voice message, a chatting message, a social media message, a push message of an application, and the like, not limited by the embodiments illustrated herein.

FIG. 1 depicts an exemplary computer-based system 100 illustrating aspects of technologically improved context-aware caller identification via utilization of at least one machine learning technique, in accordance with one or more embodiments of the present disclosure. An exemplary system 100 may include at least one server 101, and at least one first computing device 150 associated with a first user, which may communicate 103 over at least one communication network 105. In some embodiments and in optional combination with one or more embodiments described herein, the system 100 may further include and/or be operatively connected and/or be in communication (e.g., electronic communication, telecommunication) with at least one second computing device 180 associated with a second user, the second computing device 180 may also communicate with via the communication network 105 to, for example, receive phone call(s), SMS message(s), MMS message(s), chat application message(s), social media message(s), and the like, from the first computing device 150.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution, such as a credit card company that services an account of the user, and thereby having access to transactions performed by various users in addition to their respective account information. For example, the second user may incur a transaction, using a transaction card issued by the credit card company, with a computing device of a merchant (not shown herein) either online or at a point of sale (POS) device of the merchant via placing an order for a good, a service, or some combination thereof. As illustrated with more details below, in some embodiments, the first user may be associated with a delivery portion associated with the transaction performed by the second user with the merchant.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with context-aware caller identification, in conjunction with or independent of context-aware caller identification functionality implemented at the first computing device 150 and/or the second computing device 180.

In some embodiments, the features and functionality may include operations such as: obtaining training data (e.g., training information of a plurality of entities, training activity information associated with a plurality of activities associated with the plurality of entities, training phone number information of a plurality of phone numbers associated with a plurality of service providers, the plurality of service providers associated with delivery portions of the plurality of activities, training timing information associated with one or more communications from the plurality of service providers in association with delivery portions of the plurality of activities, and/or training profile information and/or contextual information associated with the plurality of service provider and/or entities); obtaining a trained call verification machine learning model that determines when a phone number is associated with a service provider that is associated with a delivery portion of a user activity with an entity within a time window; receiving an indicator identifying a permission by the second user to detect phone calls, emails, messages, and/or other communications received at the second computing device of the second user; receiving an indication that at least one communication is received by the second user from the first user; receiving transactional information of at least one transaction associated with the second user; utilizing the trained call verification machine learning model to determine, based at least in part on the activity information and the indication of the at least one communication, that the first user is the particular service provider that is associated with a delivery portion of the particular activity associated with the particular entity; and instructing the second computing device to display the call-specific first user contextual information to the second user upon detecting an incoming call associated with the at least one phone number of the first user. In some embodiments not shown herein, the features and functionality of the server 101 may be partially or fully implemented at the second computing device 180 such that the illustrative process to provide location-aware caller identification may be performed partially or entirely on the second computing device 180.

In some embodiments, the application(s) and data 108 may include an exemplary call verification machine learning model 122. In some embodiments, the call verification machine learning model 122 may be trained at the server 101. In other embodiments, the call verification machine learning model 122 may be trained by another entity with the training data provided by another entity, and/or with the training data provided by server 101. In some embodiments, the call verification machine learning model 122 may also be trained and retrained at the second computing device 180. In the latter case, the call verification machine learning model 122 may be trained and/or retrained with training data specific to the second user at the second computing device 180.

Various machine learning techniques may be applied to train and retrain the call verification machine learning model 122 with training data and feedback data, respectively. In some embodiments, the training data may include various information related to transaction events and communication events associated therewith. By way of non-limiting examples, the training data may include transaction dates, transaction time, details of goods and/or services associated with transactions, time durations associated with the communications, location information of receiving parties (e.g., a call receiving party receiving a communication associated with a transaction at a home address, a work address, an address in the vicinity to the home address, an address in the vicinity to the work address, and the like) to the communications, indications of whether call receiving parties to the communications have programmed the phone numbers associated with the communications on their devices (e.g., saved as contacts), and the like. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network (NN), and/or a Hidden Markov Model.

In some embodiments and, optionally, in combination with any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination with any embodiment described above or below, an exemplary implementation of neural network may be executed as follows:
  a. Define Neural Network architecture/model,
  b. Transfer the input data to the exemplary neural network model,
  c. Train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination with any embodiment described above or below, the exemplary call verification machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.)

input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

In some embodiments, the application(s) and data 108 may include a call verification engine 124 that may be programmed to execute the exemplary call verification machine learning model 122. In some embodiments, the call verification engine 124 may receive, as input, activity information associated with the second user, as well as an indication of a call incoming from a phone number associated with the first user. As an output, the call verification engine 124 may utilize the call verification machine learning model 122 to determine one or more items of call-specific first user's contextual information for augmenting the caller ID information associated with the call incoming to the second user from the first user.

Still referring to FIG. 1, an illustrative second computing device 180 associated with the second user may include: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the second user for a permission to detect communications via the second computing device 180 (e.g., phone calls, SMS, emails, etc.); detecting communications via the second computing device 180 according to the permission obtained from the second user; receiving, and/or storing call-specific caller contextual information 198; and triggering the second computing device 180 into displaying the call-specific caller contextual information as part of the caller ID information associated with the phone number of the first user, to the second user, upon detecting a call incoming from the phone number of the first user. This way, via providing the first user's caller contextual information that is particular to the call and of interest to the second user as part of the caller ID information identified by the phone number associated with the first user, the above-described shortcoming allowing for telecommunication security breach may be remedied or mitigated to enable enhanced and more robust communication security.

In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the second computing device 180. For instance, such application may be configured to detect a variety of communications of the second user at the second computing device 180, intercept those communications at the second computing device 180, monitor those communications at the second computing device 180, and/or interject one or more suitable controls (e.g., user operable controls) over those communications at the second computing device 180. In some embodiments, such application may be configured to obtain information of the communication transmitting party(ies) (e.g., the calling phone number), information of the communication (e.g., the calling time of a phone call), the content of the communication (e.g., the identity of an SMS sending entity, the content of the conversation of a phone call). In some embodiments, such an application may be configured to obtain permissions from the second user in order to execute all or part of the exemplary functionality described above. In some embodiments, the application 194 may be configured to execute on the first computing device 150 as well.

In some embodiments, for the purpose of simplicity, features and functionalities associated with the exemplary call verification machine learning model 122 (e.g., training, retraining, etc.) are illustrated as implemented by components of server 101. It should be noted that one more of those call verification machine learning model-related aspects and/or features may be implemented at or in conjunction with the second computing device 180 of the second user. For example, in some embodiments, the call verification machine learning model 122 may be partially trained at the server 101 with, for example, other users' activity information (e.g., transaction information) and corresponding phone call events associated with respective delivery portions thereof, and in turn transmitted to the second computing device 180 to be fully trained with, for example, the second user specific activity information and phone call events associated with the respective delivery portions thereof. In another example, the converse may be performed such that the machine learning model 122 may be initially trained at the second computing device 180 and subsequently transmitted to the server 101 for application and/or further training with training data from other users.

While only one server 101, first computing device 150, second computing device 180, and network 105 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For example, in some embodiments, the features and functionality of the server 101 may be partially, or fully implemented at the first computing device 150 and/or the second computing device 180. In another example, in some embodiments, the features and functionality of the second computing device 180 may be partially, or fully implemented at the server 101. In yet another example, in some embodiments, the features and functionality of the first computing device 150 may be fully or partially implemented at the second computing device 180, and vice versa, not limited by the embodiments illustrated herein.

Figures 2A, 2B:
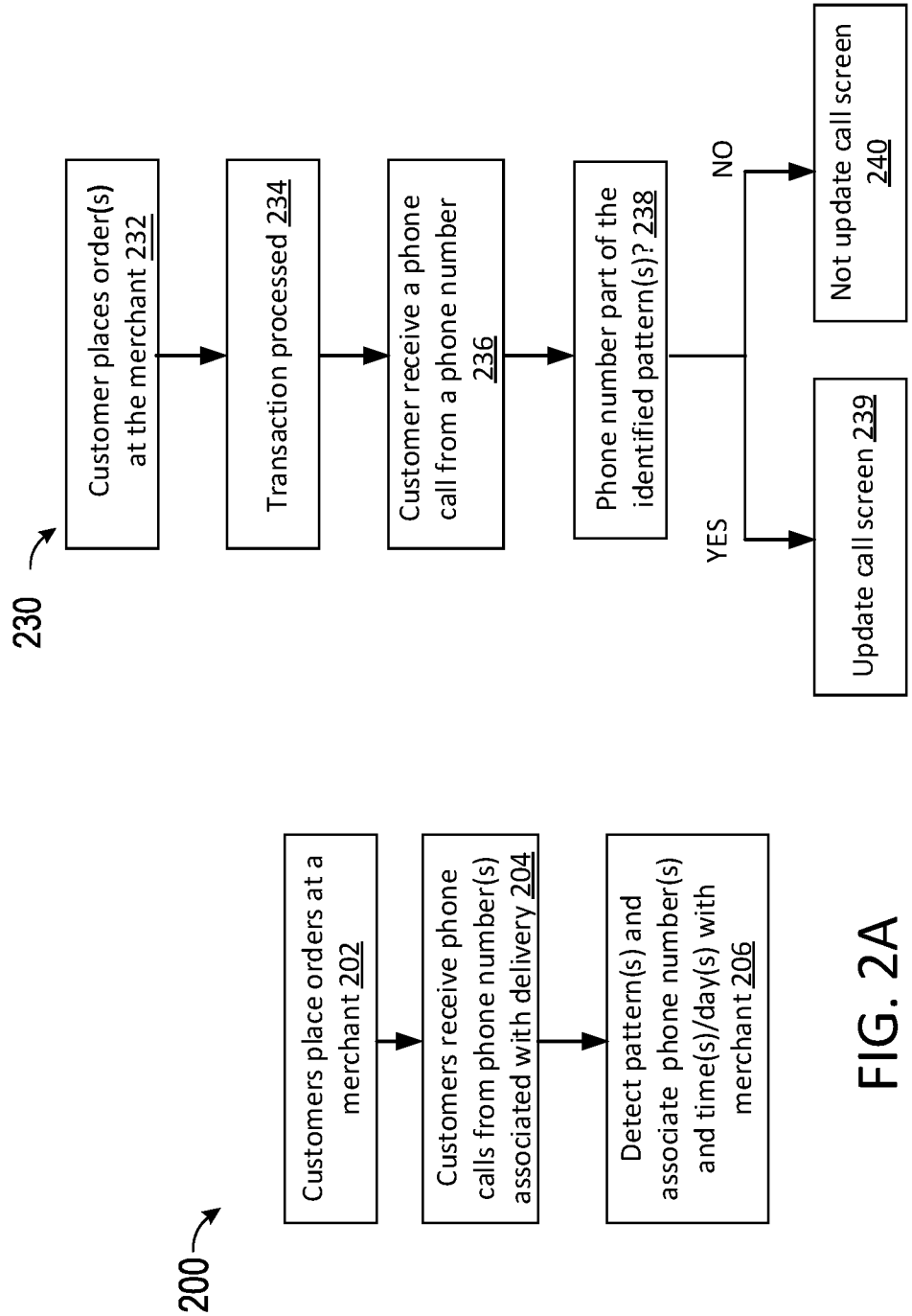
FIGS. 2A and 2B are diagrams illustrating an exemplary process involving aspects and features associated with context-aware caller identification, consistent with exemplary aspects of certain embodiments of the present disclosure.

FIGS. 2A and 2B are diagrams illustrating an exemplary context-aware caller identification using one or more machine learning techniques, consistent with exemplary aspects of certain embodiments of the present disclosure. In this illustrated embodiment, an exemplary context-aware caller identification system providing context-aware caller identification information for calls received at a device of a customer may include a training phase 200 and a prediction (e.g., execution) phase 230. In the training phase 200, a machine learning model (e.g., the call verification machine learning model 122) may be trained with various training data observed or otherwise obtained for a multitude of customers' activities and phone call events associated therewith. In the prediction phase 230, the call verification machine learning model, trained in the training phase 200, may be utilized to predict whether an incoming call from an unknown phone number is associated with an activity of the customer (instead of being spam). For example, the trained call verification model may be applied to predict whether the incoming call is associated with the delivery portion of a transaction of the customer. Here, the customer(s) may be the second user of FIG. 1, the device may comprise the second computing device 180, and the call(s) may be placed by the first user from the first computing device 150 as illustrated in FIG. 1.

In the illustrative embodiment shown in FIG. 2A, customers may place (202) one or more orders (e.g., transactions) at a merchant who may operate on-line, in a physical store, or in some combination thereof. The orders may include those that require delivery services (e.g., food orders, grocery orders, gift orders, ride hailing, etc.) and those that may not require delivery services (e.g., food orders associated with pick up options, merchandise orders with in-store pick up options, a purchase of gasoline at a gas station, etc.). Here, for the purpose of training (and/or retraining) the call verification machine learning model to predict whether a call incoming from an unknown phone number is associated from a delivery portion of an order above described, information of those orders associated with delivery services may be included in the training data. By way of non-limiting examples, the information may include various transaction information such as, but not limited to, a time of a transaction, a merchant name of the transaction, a transaction amount, the items ordered, the address of the merchant, the address of a delivery address, and the like. Such transaction information may be available to a banking system that processes the transaction incurred by customers placing the one or more orders at the merchant. For instance, transaction information for a given transaction may be received at the time a charge is posted and/or authorized (e.g., when a credit card is swiped, a digital card is scanned for payment at a restaurant, when an on-line payment is made to purchase a product/service, etc.).

For those orders requiring delivery portions to fulfill, the customers may receive (204) phone calls from the phone numbers associated with the delivery portions of the orders. In some embodiments, a transaction may be incurred prior to the delivery portion of an order being fulfilled. For example, for an order of food or merchandise, the customers may incur the transactions corresponding to the orders prior to receiving the above-described phone calls associated with the delivery service that is to complete the orders. In other embodiments, a transaction may be incurred after the delivery portion of an order being fulfilled. For example, for orders of services (e.g., transportation rides), the customers may incur a transaction for the service ordered after the ride is completed at its scheduled destination, which happens after the customers receives the above-described phone calls associated with the delivery portion of the service ordered. Here, information related to these phone calls may be included in the training data. By way of non-limiting examples, the call related information may include various information such as, but not limited to, a time of a call, a phone number from which a call is placed, the content of the conversation of a call, and the like. Such call related information may be, for example, captured by an application such as the application 194 executing on the devices of the customers with the customers' permissions, and reported to the server 101.

In both scenarios, once the information of the orders and the information of the phone call events are both captured over various customers' ordering experience with the merchant, one or more patterns characterizing the observed orders and the phone call events associated with the delivery portions of these orders may be detected (206). In some embodiments, such detection may be performed using one or more machine learning techniques as described above. In some implementations, the detected pattern(s) may be stored such that the phone numbers associated with the delivery portions may be recorded with various information such as the respective delivery times, delivery days, deliver-to addresses, deliver-from addresses, the amount of time lapse between the transaction time and the call time, the information of the merchant, and the like. According to other aspects of the embodiments, various profile and/or contextual information may be observed or otherwise obtained in association with the above described orders and phone call events. For example, profile/contextual information of the customers (e.g., the second user of FIG. 1), the merchant, delivery service providers (e.g., the first user of FIG. 1) may be obtained and included as part of the training data to train the call verification model as well, the details of which is described with reference to FIG. 4, below.

The system in the prediction phase 230 may apply the trained call verification machine learning model to monitor phone calls incoming at the device of the customer to predict whether a particular phone call is associated with a delivery portion of an order placed by the customer. In various embodiments, the system may detect communications such as phone calls received at the device of the customer using an illustrative application such as the application 194, with the permission of the customer. In this example, the customer places (232) an order(s) at the merchant, which in turn causes a transaction to be processed (234). Next, the customer receives (236) a phone call from a phone number unknown thereto. At this point of time, in some embodiments, already notified with a transaction, the system may be triggered to supply the detected phone call information to the trained call verification machine learning model such that to determine whether this particular phone call is associated with the transaction processed in step 234. In this illustrative example, the system may verify (238) the particular incoming call against the pattern(s) identified during the training phase 200. In some embodiments, the identified pattern(s) used in step 238 may be the pattern(s) identified based on orders from various customers with the same merchant. In other embodiments, the identified pattern(s) used in step 238 may include the pattern(s) identified based on orders from various customers with one or more merchants other than or including the merchant involved in the training phase 200. As a result, and as shown here in FIG. 2B, when determining that the particular incoming call is associated with the transaction of the customer, e.g., the delivery portion of the order incurring the transaction, the system may instruct the device of the customer to update (239) a call screen to notify the customer of the determination. On the other hand, when determining that the particular incoming call is not associated with the transaction of the customer, e.g., the delivery portion of the order incurring the transaction, the system may instruct the device of the customer not to update (240) a call screen. Various embodiments herein may be configured such that any suitable information relating to the order, the transaction, the merchant, the delivery service provider, and the like may be communicated to the device of the customer as part of the information to augment the caller ID information displayed at the calls screen in step 239. More details are described with reference to FIGS. 3B-3C, below.

In some embodiments, and as above described, the system may be triggered into applying the training machine learning model upon detecting both a call incoming at the device of the customer and a transaction performed by the customer. In some embodiments, the customer may perform multiple transactions around the same time the order is placed with the merchant at step 232 and/or between the order time and the time when the phone call is received at the device at step 236. In some embodiments, the system may be configured to filter the transactions contemporaneous to the one incurred by the order placed in step 232 such that, for example, only the transactions associated with a potential delivery service (e.g., not to include transactions paying for gas, utility bills, food pick-up, and the like) are utilized. In one example, details of such transaction may be extracted so that the system may obtain the information of the merchant and apply a merchant specific call verification model (e.g., merchant specific pattern(s) of FIG. 2A) to determine whether the call is associated with the transaction with the specific merchant. Various embodiments herein may be configured such that the system is part of an intelligent caller ID augmentation system that can, for example, apply suitable context(s) associated with the device and/or the customer to trigger the application of corresponding machine learning model(s) (e.g., specialty ML models) to augment the caller ID information with various predictions and associative information. In one embodiment, the system may determine a time window based on the identified transaction such that a call incoming within the time window subsequent to the transaction time (or transaction authorization time) may trigger the application of the call verification machine learning model. For example, for a particular pizza shop located in the customer's neighborhood, when a call is incoming from an unknown phone number two hours after when the transaction incurring order is placed, the system may not be triggered to apply the call verification model upon determining that a time widow shorter than two hours for that particular shop (and/or for a particular order size, at a particular time, etc.). Continuing with the same example, for the same order, for an incoming call from an unknown phone number that is ten minutes after when the transaction incurring order is placed, the system may not be triggered to apply the call verification model upon determining that a time widow is longer than ten minutes for that particular shop (and/or for a particular order size, at a particular time, etc.). Various embodiments herein may be configured such that the time window may be dynamically learned and determined based on the merchant, the transaction, as well as a variety of contextual information pertinent to the transaction, and the delivery portion of the transaction. For example, for a department store delivery based on a transaction, the time window may be learned to a certain number of days given the delivery address associated with the transaction. In some embodiments, such a time window may be configured based on customer's choices such as specific delivery time, ground shipping, expedited shipping, and so on. In some embodiments, the system may receive updates with regard to the factors that affect the projected time window from the merchant, the service provider, and/or other sources.

Figure 3C:
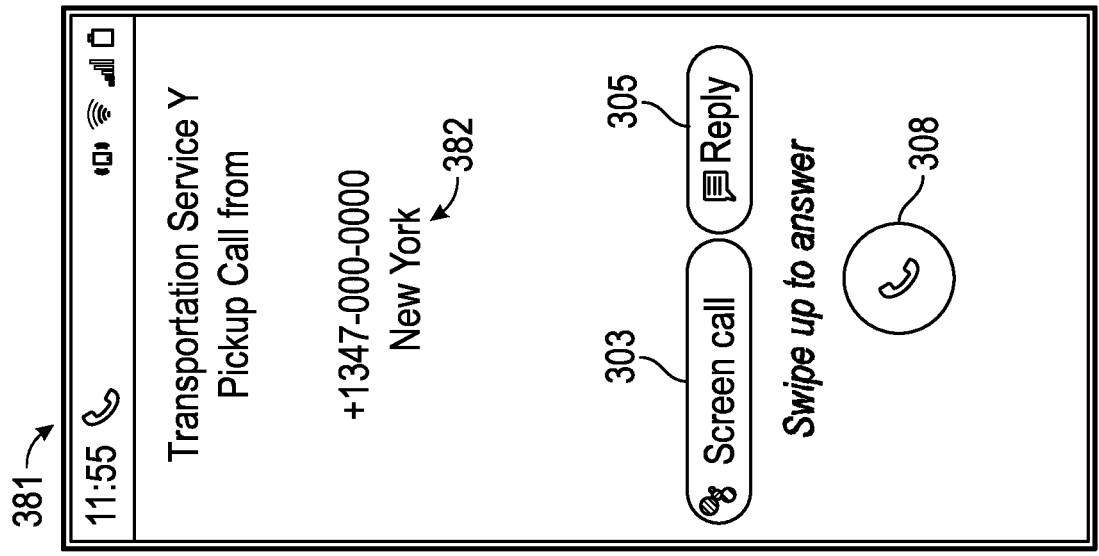
FIGS. 3A-3C are diagrams illustrating exemplary graphical user interfaces (GUIs) involving aspects and features associated with context-aware caller identification, consistent with exemplary aspects of certain embodiments of the present disclosure.
Figure 3B:
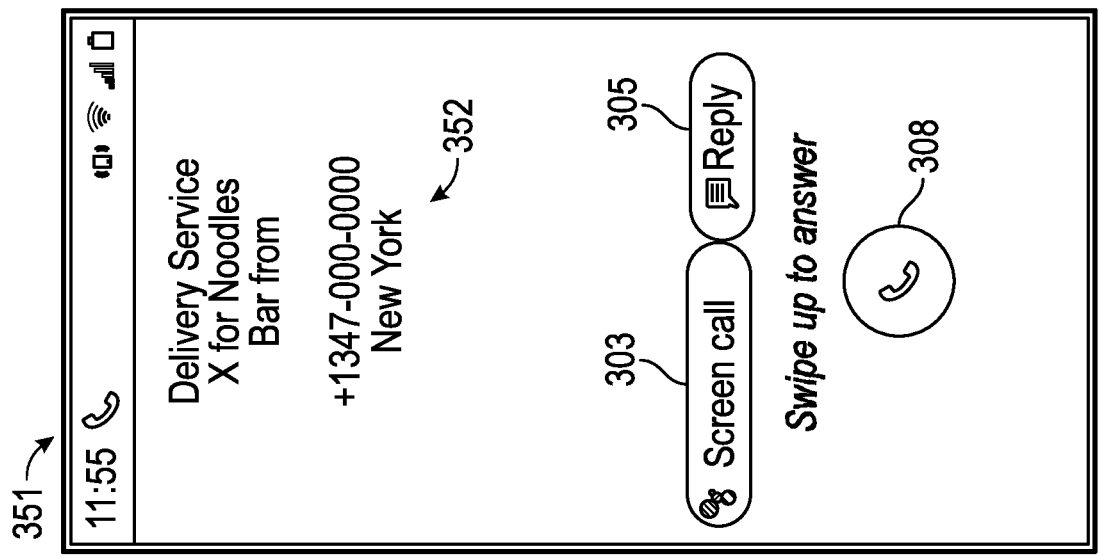
Figure 3A:
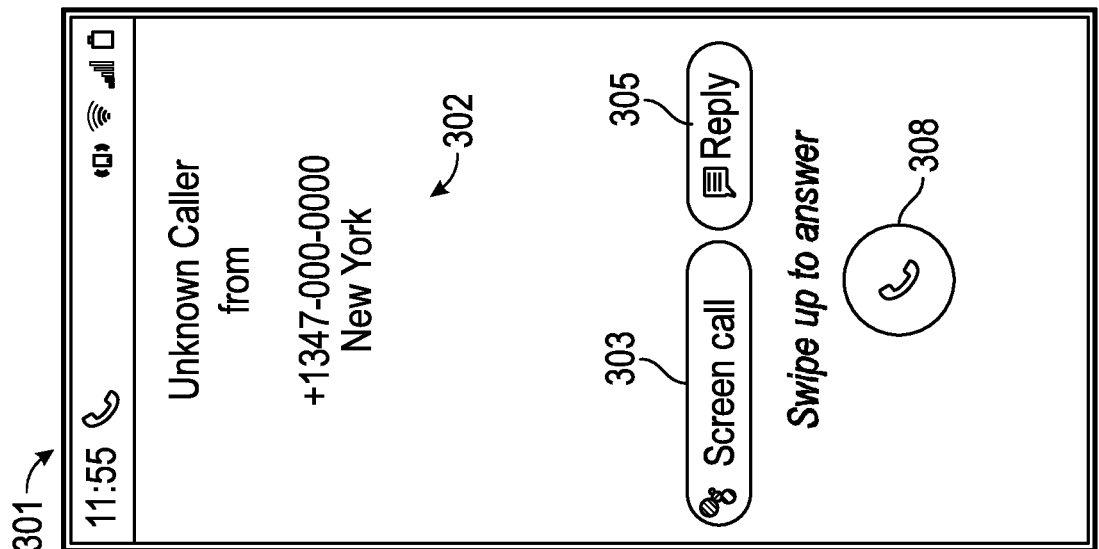

FIGS. 3A-3C are diagrams illustrating exemplary graphical user interfaces (GUIs) involving aspects associated with context-aware caller identification, consistent with exemplary aspects of certain embodiments of the present disclosure. In some embodiments, the GUIs may be provided by an illustrative application (e.g., the application 194 executing on the second computing device 180 of FIG. 1) and shown on a display of a mobile device (e.g., the second computing device 180 of FIG. 1). In some embodiments, prior to the GUIs being displayed in response to a call incoming at the mobile device, a triggering condition has occurred to activate the application 194 into performing context-aware caller identification. In other embodiments, the application 194 may be executing on the mobile device (e.g., detecting communications received or initiated at the mobile device with the permission from the user) regardless of whether there has been a triggering condition detected. In some implementations, a triggering condition may include an indication that the user has incurred a transaction with a merchant, the transaction to be fulfilled with a service portion. In some embodiments, the triggering condition may further include a time window as described above.

In some embodiments, and as shown in FIGS. 3A-3C, the application 194 may be configured to display the context-aware caller identification information (e.g., call-specific caller contextual information) to the user as part of the caller ID information (e.g., an enhanced GUI for representing caller ID). For instance, the application 194 may be configured to make an API request (e.g., a push call) to the phone interface application (e.g., the native phone application configured to display conventional caller ID information on the display of the mobile device) to pass the information of the context-aware caller identification information, for example, as a parameter to the phone interface application. As a result, upon receiving the information of the context-aware caller identity information, the phone interface application may be configured to display the information such as the context-aware caller identification information on the display of the mobile device.

Any suitable techniques may be implemented to represent and notify to the user of the context-aware caller identification information, not limited by the embodiments illustrated herein. By way of non-limiting examples, the context-aware caller identification information may be provided to the user using media such as an audio message, a graphical display (e.g., a banner, a float window overlaying the GUI of the native phone interface application, etc.), a push notification, a textual display at the GUI elements of a home screen of the computing devices, and so on.

FIG. 3A illustrates an exemplary GUI 301 of the illustrative application (e.g., the application 194) for displaying caller ID information to the user upon a call incoming at the mobile device. The GUI 301 may include a caller ID 302, and a set of buttons 303, 305, and 308 for the user to select. Here, the caller ID 302 may be configured to display to the user that the call is from a calling entity associated with a calling phone number, i.e., "1-347-000-0000," and "New York" as the area associated with the phone number's area code.

In this illustrative embodiment, the phone number may have been determined as not associated with the service portion of the transaction incurred by the user, or, as described above with reference to FIG. 2B, the phone number may not have a corresponding match with the identified pattern(s). Thus, the application 194 may not know any additional information of the caller that pertains to the particular call, absent any notification of such information about this particular phone number. As a result, at the GUI 301, the caller ID information may not be augmented and hence displayed without any call-specific information. For example, using the native caller ID feature of the mobile device, the caller ID information may be determined as "Unknown Caller" based on that the particular phone number "1-347-000-0000" is unknown to the user. As such, here in FIG. 3A, the GUI 301 may be configured to display the caller ID 302 as "Unknown Caller from 1-347-000-0000 New York."

Here, at GUI 301, the user can interact with the selectable options to perform actions with regard to the pending incoming call. In this example, the user can select the button 303 to screen the incoming call, select the button 305 to reply with a message, or select the button 308 to swipe up to answer the incoming call. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofing phone numbers, and the like.

Further, the user may perform other actions upon the incoming call in addition to or in place of those illustrated in FIG. 3A. For example, the user can interact with the GUI 301 to decline the incoming call while it is still pending, report the phone number included in the caller ID 302 to a server (e.g., the server 101 of FIG. 1) or log locally as associated with a delivery service associated with a transaction with a merchant without screening the call or after screening the call, report the phone number or log locally as associated with a delivery associated with a transaction with a merchant after selecting the button 308 to answer the call, report the phone number or log locally as not associated with a delivery associated with a transaction with a merchant after selecting the button 308 to answer the call, and the like.

FIG. 3B illustrates an exemplary GUI 351 of the illustrative application (e.g., the application 194) for displaying caller ID information to the user upon a call incoming at the mobile device. The GUI 351 may include a caller ID 352, and a set of buttons 303, 305, and 308 for the user to select. Here, similar to the GUI 301, the caller ID 352 may be configured to display to the user that the call is from a caller associated with a calling phone number, i.e., "1-347-000-0000," and "New York" as the area associated with the phone number's area code. The difference here is that, the calling phone number may have been determined as associated with the delivery portion of the transaction incurred by the user with the merchant, or, as described above with reference to FIG. 2B, the phone number may have a corresponding match with the identified pattern(s). Thus, the application 194 may be provided with the additional information of the caller that pertains to the particular call. As a result, at the GUI 351, the caller ID information may be augmented with the determined additional call-specific caller identification information. For example, using the augmented information notified to the application 194, the call-specific caller ID information may be determined and displayed as a name of actual delivery service (e.g., "Delivery Service X's Delivery") even though the particular phone number "1-347-000-0000" is unknown to the user.

In some embodiments, and as shown here in FIG. 3B, the context-aware caller identification information determined may include further information with regard to the specific call. By way of non-limiting examples, the context-aware caller identification information may include information related to the merchant with which the transaction is incurred. In one example, the information related to the merchant may include the type of the merchant (e.g., food delivery, grocery delivery, Amazon delivery, department store delivery, etc.). Here, as shown in FIG. 3B, in addition to determining the incoming call as associated with a Delivery Service X's delivery, the call-specific caller contextual information may be determined to include the merchant information of "Noodles Bar." As such, here in FIG. 3B, the GUI 351 may be configured to display the caller ID 352 as "Delivery Service X's Delivery for Noodles Bar from 1-347-000-0000 New York."

In some embodiments, and not shown here in FIG. 3B, the call-specific caller contextual information may be determined to include information related to the transaction, and/or information related to the delivery portion of the transaction. Continuing from the example above, the caller ID 352 may further display information such as the detailed order information (e.g., the order time, items of the order, the amount of the order, a type of the transaction as a credit card transaction, a debit card transaction, an online transaction, an point of sale (POS) transaction, etc.) for which the transaction is performed, and/or the delivery condition(s) (e.g., routes taken for the delivery, weather information, traffic information, etc.). Any suitable content that can be determined in association with the transaction, the merchant, the delivery service may be provided as part of the call-specific caller identification information to the application 194, not limited by example illustrated herein.

Here, at GUI 351, the user can also select the button 303 to screen the incoming call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3B. For example, the user can interact with the GUI 351 to decline the incoming call while it is pending, report the phone number included in the caller ID 352 to the server (e.g., the server 101 of FIG. 1) or log it locally as associated with a delivery service of a transaction with a merchant without screening the call or after screening the call, report or log locally the phone number as associated with a delivery service of a transaction with a merchant after selecting the button 308 to answer the call, report or log locally the phone number as not associated with a delivery service of a transaction with a merchant after selecting the button 308 to answer the call, and the like.

FIG. 3C illustrates an exemplary GUI 381 for displaying caller ID information to the user upon a call incoming at the mobile device. The GUI 381 may include a caller ID 382 and a set of buttons 303, 305, and 308 for the user to select. Here, similar to the GUIs 301 and 351, the caller ID 382 may be configured to display to the user that the call is from a caller associated with a calling phone number, i.e., "1-347-000-0000," and "New York" as the area associated with the phone number's area code. The difference here is that the calling phone number may have been determined as associated with the delivery portion of the transaction that is yet to be incurred by the user with the merchant. In some embodiments, the order placed by the user may incur the transaction to be conditioned upon the service portion associated with the order being completed. For example, for a transportation ride order, the driver may initiate the incoming call to fulfill the service prior to the transaction being incurred. In these scenarios, the transaction may be first authorized (e.g., such that the server 101 may have access to the details of the transaction as well), and then completed after the call associated with the servicing of the order.

Similarly, the application may be provided with additional information of the caller that pertains to the particular call. As a result, at the GUI 381, the caller ID information may be augmented with the determined additional call-specific caller identification information. As such, here in FIG. 3C, the GUI 381 may be configured to display the caller ID 382 as "Transportation service Y Pick up Call from 1-347-000-0000 New York."

In some embodiments, and not shown in FIG. 3C, the context-aware caller identification information determined may similarly include further information with regard to the specific call. By way of non-limiting examples, the context-aware caller identification information may include information related to the transaction pending, information related to the merchant with which the transaction is pending, information of the delivery portion of the order. Any suitable content that can be determined in association with the pending transaction, the merchant, the delivery portion may be provided as part of the call-specific caller identification information to the application 194, not limited by example illustrated herein.

Here, at GUI 381, the user can also select the button 303 to screen the call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3C. For example, the user can interact with the GUI 381 to decline the incoming call while it is pending, report the phone number included in the caller ID 382 to the server (e.g., the server 101 of FIG. 1) or log it locally as associated with a delivery service of a pending transaction with a merchant without screening the call or after screening the call, report or log locally the phone number as associated with a delivery service of a pending transaction with a merchant after selecting the button 308 to answer the call, report or log locally the phone number as not associated with a delivery service of a pending transaction with a merchant after selecting the button 308 to answer the call, and the like.

Figure 4:
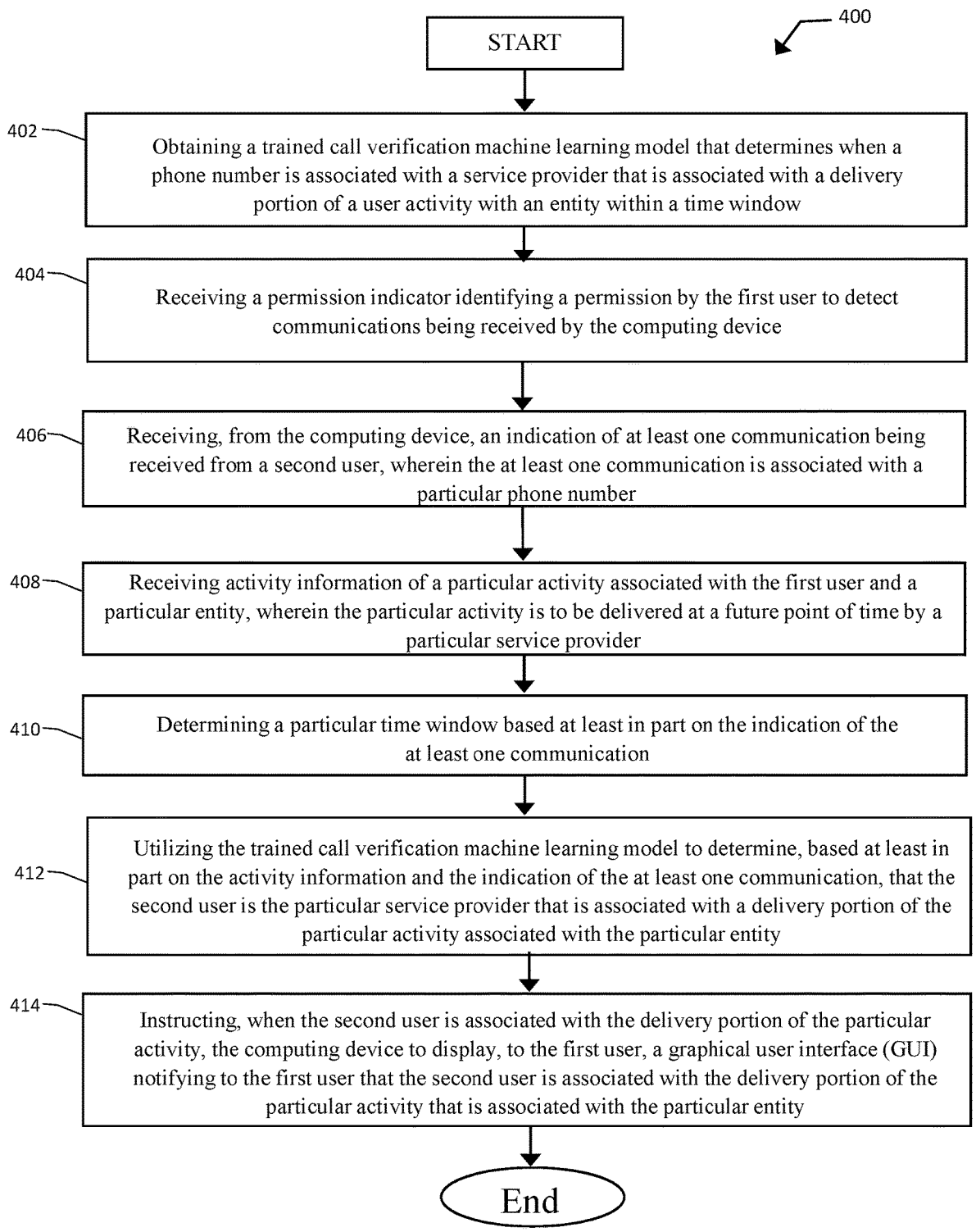
FIG. 4 is a flowchart illustrating an exemplary process related to context-aware caller identification, consistent with exemplary aspects of certain embodiments of the present disclosure.

FIG. 4 is a flow diagram illustrating an exemplary process 400 related to context-aware caller identification via machine learning techniques, consistent with exemplary aspects of at least some embodiments of the present disclosure. Referring to FIG. 4, the illustrative context-aware caller identification process 400 may comprise: obtaining a trained call verification machine learning model that determines when a phone number is associated with a service provider that is associated with a delivery portion of a user activity with an entity within a time window, at 402; receiving, from a computing device of a first user, a permission indicator identifying a permission by the first user to detect communications being received by the computing device, at 404; receiving, from the computing device, an indication of at least one communication being received from a second user, where the at least one communication is associated with a particular phone number, at 406; receiving activity information of a particular activity associated with the first user and a particular entity, where the particular activity is to be delivered at a future point of time by a particular service provider, at 408; determining a particular time window based at least in part on the indication of the at least one communication, at 410; utilizing the trained call verification machine learning model to determine, based at least in part on the activity information and the indication of the at least one communication, that the second user is the particular service provider that is associated with a delivery portion of the particular activity associated with the particular entity, at 412; and instructing, when the second user is associated with the delivery portion of the particular activity, the computing device to display, to the first user, a graphical user interface (GUI) notifying to the first user that the second user is associated with the delivery portion of the particular activity that is associated with the particular entity, at 414. In other embodiments, the context-aware caller identification process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the context-aware caller identification process 400 may include, at 402, a step of obtaining a trained call verification machine learning model that determines when a phone number is associated with a service provider that is associated with a delivery portion of a user activity with an entity within a time window. With regard to the disclosed innovation, the call verification machine learning model may be trained based at least in part on one or more of: (i) information of a first plurality of entities; (ii) activity information associated with a first plurality of activities associated with the first plurality of entities; (iii) phone number information of a first plurality of phone numbers associated with a first plurality of service providers, the first plurality of service providers associated with delivery portions of the first plurality of activities; (iv) timing information associated with one or more communications from the first plurality of service providers in association with delivery portions of the first plurality of activities; and/or (v) at least one of: a) profile information of the first plurality of service providers; b) contextual information associated with the first plurality of activities; c) profile information of the first plurality of entities; or d) contextual information associated with the entities.

In some embodiments, the one or more communications from the first plurality of service providers may include any type of communications. By way of non-limiting examples, such communications may be in the forms of a call, an SMS, an MMS, an email, a voice message, a chatting message, a social media message, a push message of an application, and the like.

In some embodiments, the plurality of training phone numbers associated with the first plurality of service providers may be obtained or otherwise identified via various resources and/or services. In some examples, the phone numbers associated with calls from the first plurality of service providers may be reported by the call receiving users, identified by an incoming call detection application (e.g., the application 194) and reported to a server (e.g., the server 101 of FIG. 1), and/or identified by the first plurality of entities, and the like. In one embodiment, the call receiving users may utilize, for example, the GUI features illustrated with reference to FIGS. 3A-3C to report the phone numbers as from the first plurality of service providers completing the delivery portions of respective transactions of the users. In one embodiment, the service provider and the entity may be the same entity.

In some embodiments, the information of the first plurality of entities may include any type of information pertaining to the entities. By way of non-limiting examples, the information may include a name of an entity, an address of the entity, an operating time of the entity, and the like. The activity information may include any type of information pertaining to the activities as well. Also by way of non-limiting example, the activity information may include timing information, location information, descriptive information of the activities, and the like. In some embodiments, the first plurality of activities may include a plurality of transactions, either online or in-store, in association with purchasing of goods, services, or some combination thereof.

In some embodiments, the timing information of the training data may include a transaction time and a delivery time, for each activity of the first plurality of activities. In other embodiments, with the training activity information and the training one or more communications, such timing information may be computed or derived as a time window relative to an activity.

The service provider profile information may comprise information relating to one or more of: demographic information, account information, rating information, operating time information, historical service information, any data provided by the service providers, any data provided on behalf of the service providers, and the like. The contextual aspect of the service provider profile information and service provider contextual information may comprise information relating to one or more of: a timing, a location of the service provider, an action of the service provider, calendar information of the service provider, contact information of the service provider, habits of the service provider, preferences of the service provider, communication history, past service history, traffic information associated with the services performed by the service provider, weather information associated with such services, events and/or holiday information associated with such services, routes taken in association with such services, types of transportation taken in association with such services, description of the content associated with such services, profile and/or contextual information of individual(s) and entity(ies) the service provider is associated with, and the like. In some embodiments, the service provider profile information and/or service provider contextual information may be provided by the service provider, detected by a server (e.g., the server 101 of FIG. 1), and/or a component external thereto, or in some combination thereof.

The entity profile information may comprise information relating to one or more of: type of business, headquarter location, branch location, employee information, management information, revenue information, press release information, product release information, stock information, privacy information, any data provided by the entity, and the like. The contextual information of an entity may comprise information related to one or more of: a timing, a location, how many instances of activities are being engaged (e.g., how many pending orders, etc.), how many instances of activities are completed (e.g., how many orders are completed, etc.), how many service providers are associated therewith, and the like.

Trained with the above-described training data, the call verification machine learning model may be utilized to receive an input of activity information associated with an activity of a user (engaged with an entity) and information of a call incoming at a computing device of the user such that to predict whether the call is from a service provider associated with a delivery portion of the activity. In some embodiments, the call verification machine learning model may conduct such a prediction based on an input of a time window, for example, as described above. In some embodiments, the call verification machine learning model may be trained with at least the above-described data to determine the time window based on the particular activity and/or the particular call. In other embodiments, the time window may be pre-configured by, for example, the server 101, the second user at the second computing device 180, a computing device associated with the entity, the first computing device 150, and the like.

Taking an order of a meal from a restaurant for example, the call verification machine learning model may be trained to predict, for the particular restaurant and a particular user's delivery address, a time window starting from the transaction time (e.g., order time) to the delivery call time, as a certain time lapse. In another example, such a prediction may be further learned and made based on one or more items of other information such as the size of an order, the particular items of the order, the particular timing of the order (e.g., relative to the day, the week, the month, a holiday, etc.), the particular delivery time, the particular weather condition, the particular traffic condition, the particular number of deliveries engaged by a service provider servicing the delivery, how busy the restaurant is relative to one or both of the order time and the requested delivery time, and so on.

In some embodiments, the call verification machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such a financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training data, and/or trained models from a third-party data source, third-party machine learning model generators, and the like.

It should be further understood that, in some embodiments, the call verification machine learning model may be trained via a server in conjunction with a computing device of the user. Here, for example, the server may be configured to initially train a baseline call verification model based on the above-described training data of the first plurality of users (not including the user) and/or a plurality of such training data from the plurality of third-party data sources. Subsequently, the baseline call verification model may be transmitted to the computing device associated with the user to be trained with the particular training data associated with the user. In one example, the call verification model may be trained as an entity-specific model, a group of entity-specific models, a geo location-specific model, a time-specific model, and the like. A group of entities may be based on various characteristics such as the types of activities (e.g., services of restaurants, coffee shops, auto repair shops, department stores, online retailers, etc.), the locations of the entities (e.g., downtown area, a particular neighborhood, etc.), and the like.

The context-aware caller identification process 400 may include, at 404, a step of receiving, from a computing device of a first user, a permission indicator identifying a permission by the first user to detect communications being received by the computing device. In some embodiments, the permission indicator may be received from an illustrative application such as the application 194 executing on a computing device of the first user. The details are similar to those described with reference to FIG. 1, and not repeated herein. In other embodiments, the permission indicator may be received from an illustrative application such as a web page allowing the first user to configure his or her settings at a web browser. The first user may configure the settings related to calls, and/or other communication detection capabilities for various computing devices thereof. That is, the permission indicator may be received from an application and/or a computing device other than the application for detecting calls (and other communications), or the computing device on which the call detecting/caller identification application is executing.

The context-aware caller identification process 400 may include, at 406, a step of receiving, from the computing device, an indication of at least one communication being received from a second user, where the at least one communication is associated with a particular phone number. The at least one communication may comprise various communication(s) (e.g., a call, an SMS message, an MMS message, an email message, a voice message, a chat message, etc.) that is received from the second user.

The context-aware caller identification process 400 may include, at 408, a step of receiving activity information of a particular activity associated with the first user and a particular entity, where the particular activity is to be delivered at a future point of time by a particular service provider. Details of the activity information and the entity may be similar to those described with reference to step 402, and not repeated herein. In one embodiment, the activity may include a transaction incurred by the user with an order from a merchant for a good, a service, or some combination thereof.

The context-aware caller identification process 400 may include, at 410, a step of determining a particular time window based at least in part on the indication of the at least one communication. In some embodiments, the call verification machine learning model may be trained with at least the above-described data to determine the time window for the particular activity and/or the particular call. In other embodiments, the time window may be pre-configured by, for example, the server 101, the second user at the second computing device 180, a computing device associated with the entity, and the like. Details of the activity information and the entity may be similar to those described with reference to step 402, and not repeated herein. In some embodiments, the particular time window may be subsequent to the particular activity with the particular entity. In this scenario, the particular activity may, for example, include a transaction incurred by an order of a meal or a product, which is delivered after the transaction is completed. In other embodiments, the particular time window may be prior to the particular activity with the particular entity. In this scenario, the particular activity may include, for example, a transaction incurred by an order of a service, which is delivered and/or completed prior to the corresponding transaction being completed.

The context-aware caller identification process 400 may include, at 412, a step of utilizing the trained call verification machine learning model to determine, based at least in part on the activity information and the indication of the at least one communication, that the second user is the particular service provider that is associated with a delivery portion of the particular activity associated with the particular entity. In some embodiments, the particular communication, and/or the particular activity information may be provided as input to the call verification machine learning model, which in turn may determine that the second user is the particular service provider that is associated with a delivery portion of the particular activity associated with the particular entity. In some embodiments, the determination may be qualified with a degree of confidence. In one example, the degree of confidence may be computed as a likelihood metric that identifies that the phone number is associated with the service provider associated with fulfilling user transactions.

The context-aware caller identification process 400 may include, at 414, a step of instructing, when the second user is associated with the delivery portion of the particular activity, the computing device to display, to the first user, a graphical user interface (GUI) notifying to the first user that the second user is associated with the delivery portion of the particular activity that is associated with the particular entity. In some embodiments, the GUI may be displayed when the future point of time is within the particular time window. In some embodiments, call verification machine learning model may be utilized to determine a likelihood metric identifying that the second user is associated with the delivery portion of the particular activity. In this scenario, additionally or separately, the GUI element may be further configured to notify the first user of the determined likelihood metric.

In some embodiments, the GUI may be associated with the at least one communication, wherein the GUI comprises at least one GUI element. For example, when the at least one communication received by the first user is an SMS message, the GUI may be displayed in response to the first user clicking on the SMS message into full display. In other embodiments, the GUI may be displayed in a standalone manner, without association with the at least one communication. In various embodiments, the above-described notifications may be rendered and/or displayed in any suitable form or format, such as and not limited to, an audio message, a tone, a push notification, an animated notification, a textual display at the GUI elements of a home screen of the computing devices, and so on.

Various embodiments herein may be configured such that information in addition to the notification is displayed to the first user. By way of non-limiting examples, such information notified to the first user may include: activity information of the particular activity, or entity information of a particular entity. Similar to what is described with reference to FIGS. 3A-3C, the additional information may include the information of a transaction (e.g., transacted amount, items of an order associated with the transaction, transaction type as online, at a POS, credit card based, debit card based, virtual card based, etc.) and the information of the merchant with whom the first user's activity is performed with (e.g., a physical store, an online department store, a delivery service, a transportation service, etc.).

Figure 5:
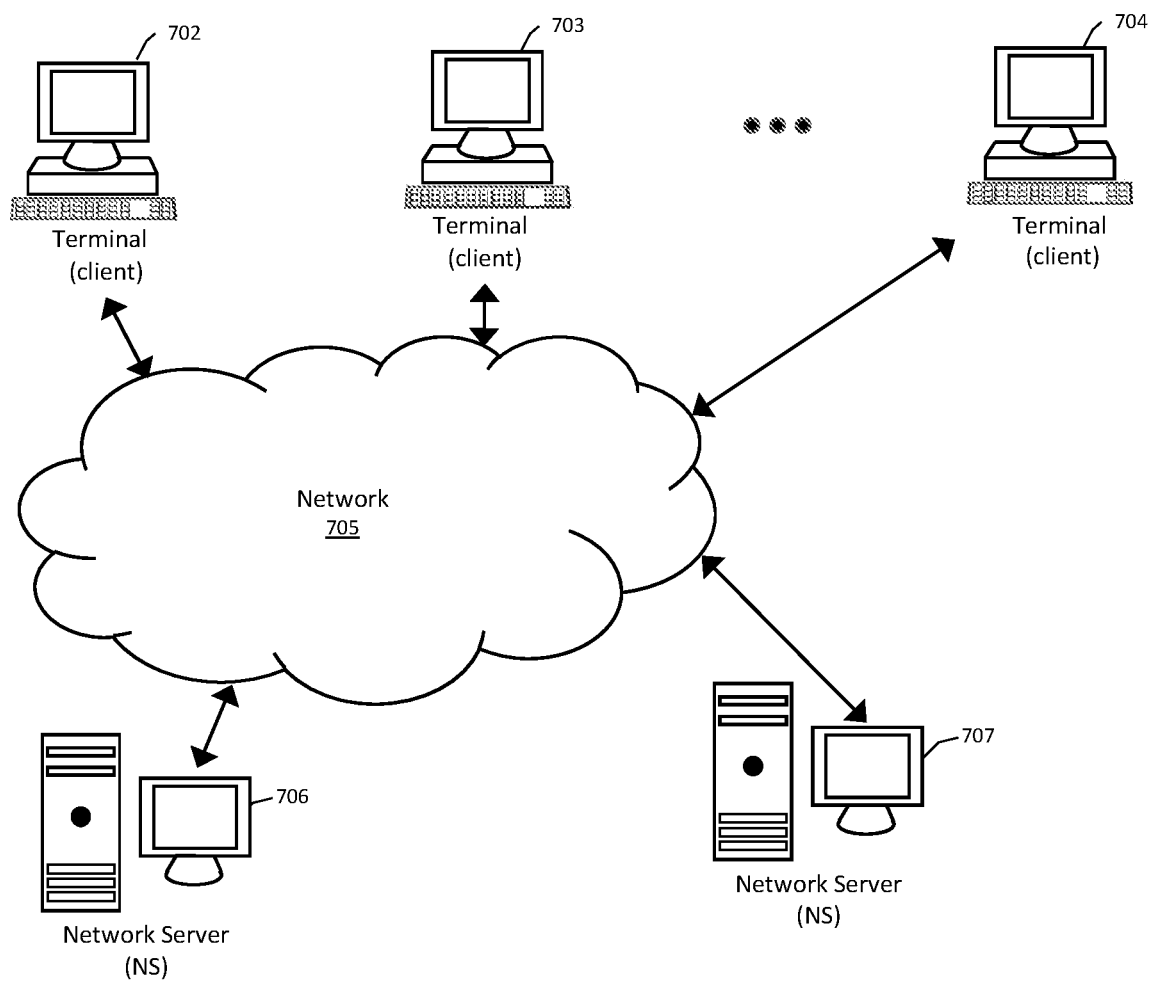
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination with any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination with any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination with any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
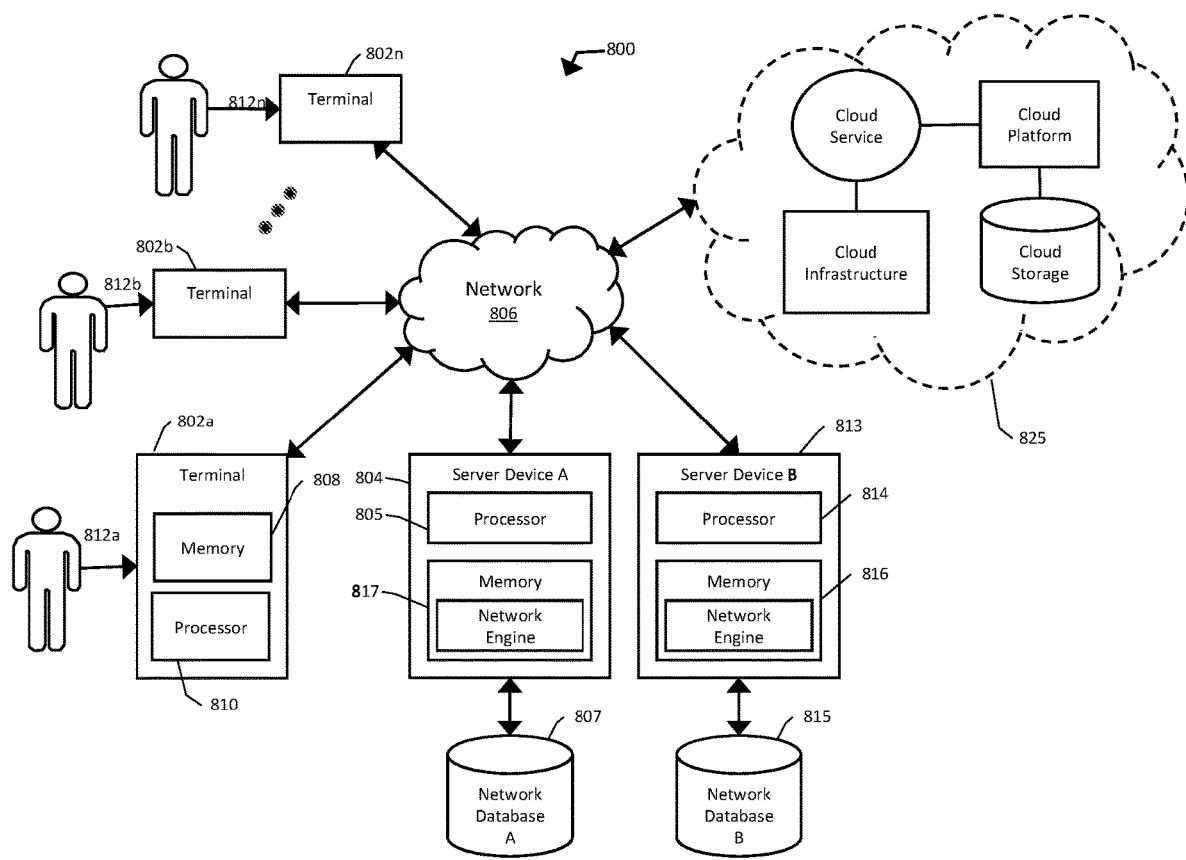
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802*a*, 802*b* through 802*n* shown each at least includes non-transitory computer-readable media, such as a random-access memory (RAM) 808 coupled to a processor 810 and/or memory 808. In some embodiments, the member computing devices 802*a*, 802*b* through 802*n* may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802*a*, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802*a* through 802*n* may also comprise a number of external or internal devices such as a mouse, a CD-ROM, DVD, a physical or virtual keyboard, a display, a speaker, or other input or output devices. In some embodiments, examples of member computing devices 802*a* through 802*n* (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802*a* through 802*n* may be specifically programmed with one or more application programs in accordance with one or more principles/methodologies detailed herein. In some embodiments, member computing devices 802*a* through 802*n* may operate on any operating system capable of supporting a browser or browser-enabled application, such as Microsoft™ Windows™, and/or Linux. In some embodiments, member computing devices 802*a* through 802*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802*a* through 802*n*, users, 812*a* through 812*n*, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802*a* through 802*n* may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
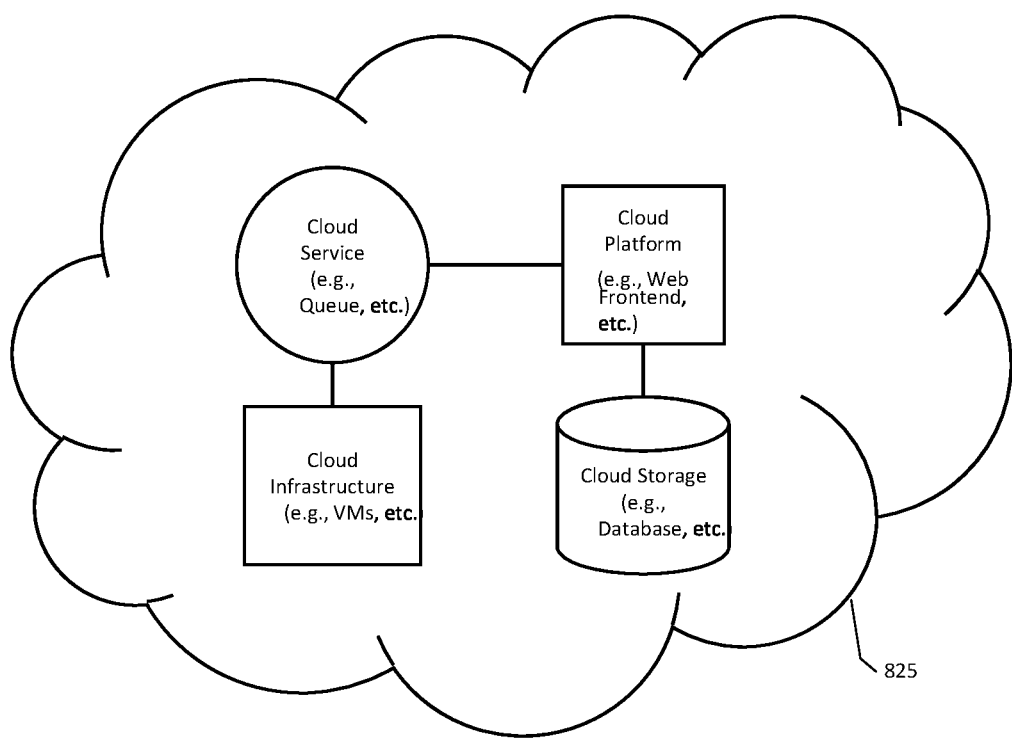
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
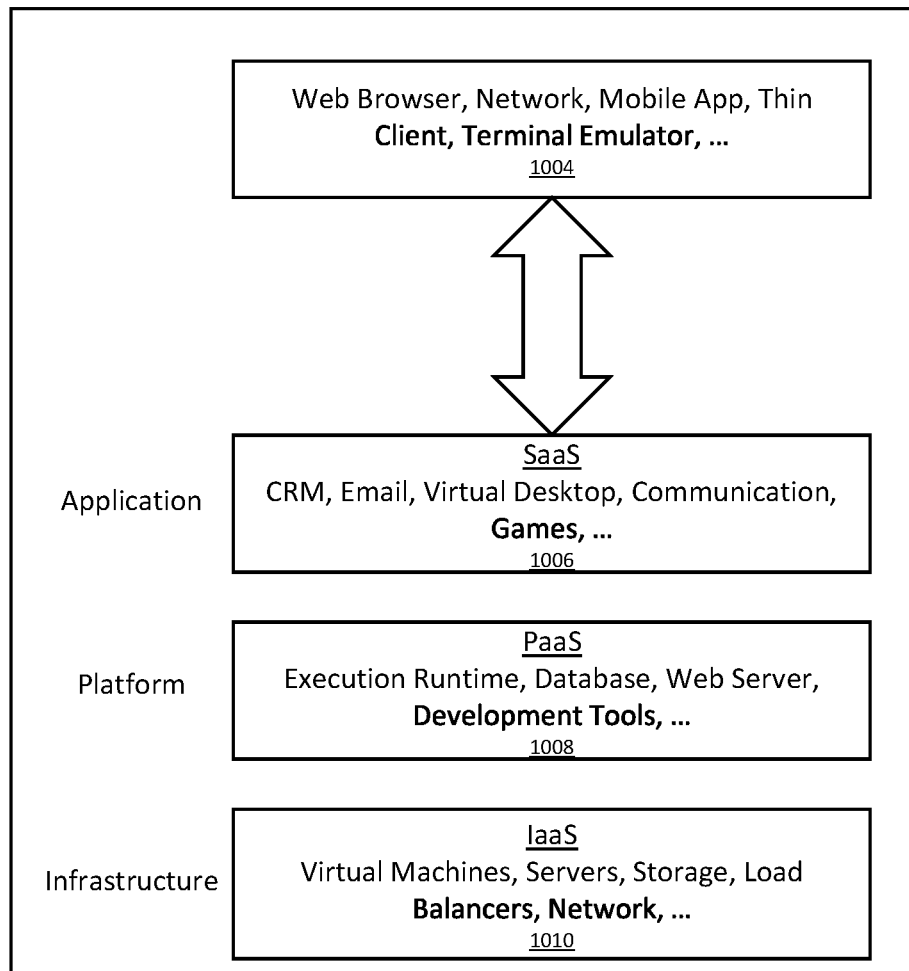

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:
obtaining, by one or more processors, a trained call verification machine learning model that determines when a phone number is associated with a service provider that is associated with a delivery portion of a user activity with an entity within a time window;
receiving, by the one or more processors, from a computing device of a first user, a permission indicator identifying a permission by the first user to detect communications being received by the computing device;
receiving, by the one or more processors, from the computing device, an indication of at least one communication being received from a second user, where the at least one communication is associated with a particular phone number;
receiving, by the one or more processors, activity information of a particular activity associated with the first user and a particular entity, where the particular activity is to be delivered at a future point of time by a particular service provider;
determining, by the one or more processors, a particular time window based at least in part on the indication of the at least one communication;
utilizing, by the one or more processors, the trained call verification machine learning model to determine, based at least in part on the activity information and the indication of the at least one communication, that the second user is the particular service provider that is associated with a delivery portion of the particular activity associated with the particular entity; and
instructing, by the one or more processors, when the second user is associated with the delivery portion of the particular activity and when the future point of time is within the particular time window, the computing device to display, to the first user, a graphical user interface (GUI) associated with the at least one communication, where the GUI includes at least one GUI element, notifying to the first user that the second user is associated with the delivery portion of the particular activity that is associated with the particular entity.

Clause 2. The method of clause 1 or any clause herein, where the trained call verification machine learning model is further trained to determine the time window; and where the determining of a particular time window based at least in part on the indication of the at least one communication includes:
utilizing, by the one or more processors, the trained call verification machine learning model to determine the particular time window.

Clause 3. The method of clause 1 or any clause herein, where the trained call verification machine learning model is further trained to determine a first likelihood metric, identifying that the phone number is associated with the service provider associated with fulfilling user transactions.

Clause 4. The method of clause 3 or any clause herein, where the utilizing the trained call verification machine learning model to determine when the second user is associated with the delivery portion of the particular activity further includes:
utilizing, by the one or more processors, the trained call verification machine learning model to determine a second likelihood metric, identifying that the second user is associated with the delivery portion of the particular activity;
where the GUI element is further configured to notify the first user of the second likelihood metric.

Clause 5. The method of clause 1 or any clause herein, where the GUI element is further configured to notify the first user of at least one of: activity information of the particular activity, or entity information of particular entity.

Clause 6. The method of clause 1 or any clause herein, where the particular time window is subsequent to the particular activity being completed with the particular entity.

Clause 7. The method of clause 1 or any clause herein, where the particular time window is prior to the particular activity being completed with the particular entity.

Clause 8. The method of clause 1 or any clause herein, where the at least one communication includes one or more of: a phone call, an SMS message, an MMS message, an email, a voice message, a chat message, or a social media message.

Clause 9. The method of clause 1 or any clause herein, where the trained call verification machine learning model has been trained based on:

i) information of a first plurality of entities,
ii) activity information associated with a first plurality of activities associated with the first plurality of entities,
iii) phone number information of a first plurality of phone numbers associated with a first plurality of service providers, the first plurality of service providers associated with delivery portions of the first plurality of activities;
iv) timing information associated with one or more communications from the first plurality of service providers in association with delivery portions of the first plurality of activities, and
v) at least one of:
a) profile information of the first plurality of service providers;
b) contextual information associated with the first plurality of activities;
c) profile information of the first plurality of entities; or
d) contextual information associated with the entities.

Clause 10. The method of clause 1 or any clause herein, where the user activity includes a user transaction.

Clause 11. The method of clause 1 or any clause herein, where the service provider and the entity include a same party.

Clause 12. A system including:
a non-transient computer memory, storing software instructions;
at least one processor of a computing device;
where, when the at least one processor executes the software instructions, the computing device is programmed to:
obtain a trained call verification machine learning model that determines when a phone number is associated with a service provider that is associated with a delivery portion of a user activity with an entity within a time window;
receive, from a computing device of a first user, a permission indicator identifying a permission by the first user to detect communications being received by the computing device;
receive, from the computing device, an indication of at least one communication being received from a second user, where the at least one communication is associated with a particular phone number;
receive, activity information of a particular activity associated with the first user and a particular entity, where the particular activity is to be delivered at a future point of time by a particular service provider;
determine, a particular time window based at least in part on the indication of the at least one communication;
utilize the trained call verification machine learning model to determine, based at least in part on the activity information and the indication of the at least one communication, that the second user is the particular service provider that is associated with a delivery portion of the particular activity associated with the particular entity; and
instruct, when the second user is associated with the delivery portion of the particular activity and when the future point of time is within the particular time window, the computing device to display, to the first user, a graphical user interface (GUI) associated with the at least one communication, where the GUI includes at least one GUI element, notifying to the first user that the second user is associated with the delivery portion of the particular activity that is associated with the particular entity.

Clause 13. The system of clause 12 or any clause herein, where the trained call verification machine learning model is further trained to determine the time window; and where to determine a particular time window based at least in part on the indication of the at least one communication includes to:
utilize the trained call verification machine learning model to determine the particular time window.

Clause 14. The system of clause 12 or any clause herein, where the trained call verification machine learning model is further trained to determine a first likelihood metric, identifying that the phone number is associated with the entity associated with fulfilling user transactions.

Clause 15. The system of clause 12 or any clause herein, where to utilize the trained call verification machine learning model to determine when the second user is associated with the delivery portion of the particular activity further includes to:
utilize the trained call verification machine learning model to determine a second likelihood metric, identifying that the second user is associated with the delivery portion of the particular activity;
where the GUI element is further configured to notify the first user of the second likelihood metric.

Clause 16. The system of clause 12 or any clause herein, where the GUI element is further configured to notify the first user of at least one of: activity information of the particular activity, or entity information of particular entity.

Clause 17. The system of clause 12 or any clause herein, where the particular time window is subsequent to the particular activity being completed with the particular entity.

Clause 18. The system of clause 12 or any clause herein, where the particular time window is prior to the particular activity being completed with the particular entity.

Clause 19. The system of clause 12 or any clause herein, where the at least one communication includes one or more of: a phone call, an SMS message, an MMS message, an email, a voice message, a chat message, or a social media message.

Clause 20. A computing device including:
a non-transient computer memory, storing software instructions;
at least one processor;
where, when the at least one processor executes the software instructions, the computing device is programmed to:
obtain a trained call verification machine learning model that determines when a phone number is associated with a service provider that is associated with a delivery portion of a user activity with an entity within a time window;
receive, from a computing device of a first user, a permission indicator identifying a permission by the first user to detect communications being received by the computing device;
receive, from the computing device, an indication of at least one communication being received from a second user, where the at least one communication is associated with a particular phone number;
receive, activity information of a particular activity associated with the first user and a particular entity, where the particular activity is to be delivered at a future point of time by a particular service provider;
determine, a particular time window based at least in part on the indication of the at least one communication;
utilize the trained call verification machine learning model to determine, based at least in part on the activity information and the indication of the at least one communication, that the second user is the particular service provider that is associated with a delivery portion of the particular activity associated with the particular entity; and instruct, when the second user is associated with the delivery portion of the particular activity and when the future point of time is within the particular time window, the computing device to display, to the first user, a graphical user interface (GUI) associated with the at least one communication, where the GUI includes at least one GUI element, notifying to the first user that the second user is associated with the delivery portion of the particular activity that is associated with the particular entity.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   obtaining, by one or more processors, a trained call verification machine learning model that determines when a phone number is associated with a service provider that is associated with a delivery portion of a user transaction with an entity within a time window;
   receiving, by the one or more processors, from a computing device of a first user, a permission indicator identifying a permission by the first user to detect communications being received by the computing device;
   receiving, by the one or more processors, from the computing device, an indication of at least one communication being received from a second user, wherein the at least one communication is associated with a particular phone number;
   receiving, by the one or more processors, transaction information of a particular transaction associated with the first user and a particular entity, wherein the particular transaction is to be delivered at a future point of time by a particular service provider;
   determining, by the one or more processors, a particular time window based at least in part on the indication of the at least one communication;
   utilizing, by the one or more processors, the trained call verification machine learning model to determine, based at least in part on the transaction information and the indication of the at least one communication, that the second user is the particular service provider that is associated with a particular delivery portion of the particular transaction associated with the particular entity; and
   instructing, by the one or more processors, when the second user is associated with the particular delivery portion of the particular transaction and when the future point of time is within the particular time window, the computing device to display, to the first user, a graphical user interface (GUI) associated with the at least one communication, wherein the GUI comprises at least one GUI element, notifying to the first user that the second user is associated with the particular delivery portion of the particular transaction that is associated with the particular entity.

2. The method of claim 1, wherein the trained call verification machine learning model is further trained to determine the time window; and wherein the determining of a particular time window based at least in part on the indication of the at least one communication comprises:
   utilizing, by the one or more processors, the trained call verification machine learning model to determine the particular time window.

3. The method of claim 1, wherein the trained call verification machine learning model is further trained to determine a first likelihood metric, identifying that the phone number is associated with the service provider associated with fulfilling user transactions.

4. The method of claim 3, wherein the utilizing the trained call verification machine learning model to determine when the second user is associated with the particular delivery portion of the particular transaction further comprises:
   utilizing, by the one or more processors, the trained call verification machine learning model to determine a second likelihood metric, identifying that the second user is associated with the particular delivery portion of the particular transaction;
   wherein the at least one GUI element is further configured to notify the first user of the second likelihood metric.

5. The method of claim 1, wherein the at least one GUI element is further configured to notify the first user of at least one of: transaction information of the particular transaction, or entity information of particular entity.

6. The method of claim 1, wherein the particular time window is subsequent to the particular transaction being completed with the particular entity.

7. The method of claim 1, wherein the particular time window is prior to the particular transaction being completed with the particular entity.

8. The method of claim 4, wherein the at least one communication comprises one or more of: a phone call, an SMS message, an MMS message, an email, a voice message, a chat message, or a social media message.

9. The method of claim 1, wherein the trained call verification machine learning model has been trained based on:
   i) information of a first plurality of entities,
   ii) transaction information associated with a first plurality of transactions associated with the first plurality of entities,
   iii) phone number information of a first plurality of phone numbers associated with a first plurality of service providers, the first plurality of service providers associated with delivery portions of the first plurality of transactions;
   iv) timing information associated with one or more communications from the first plurality of service providers in association with delivery portions of the first plurality of transactions, and
   v) at least one of:
      a) profile information of the first plurality of service providers;
      b) contextual information associated with the first plurality of transactions;
      c) profile information of the first plurality of entities; or
      d) contextual information associated with the entities.

10. The method of claim 1, wherein the user transaction includes a user transaction.

11. The method of claim 1, wherein the service provider and the entity include a same party.

12. A system comprising:
a non-transient computer memory, storing software instructions; and
at least one processor of a computing device;
wherein, when the at least one processor executes the software instructions, the computing device is programmed to:
receive, from the computing device, an indication of at least one communication being received from a second user, wherein the at least one communication is associated with a particular phone number;
receive, transaction information of a particular transaction associated with the first user and a particular entity, wherein the particular transaction is to be delivered at a future point of time by a particular service provider;
determine, a particular time window based at least in part on the indication of the at least one communication;
utilize a trained call verification machine learning model to determine, based at least in part on the transaction information and the indication of the at least one communication, that the second user is the particular service provider that is associated with a particular delivery portion of the particular transaction associated with the particular entity; and
instruct, when the second user is associated with the particular delivery portion of the particular transaction and when the future point of time is within the particular time window, the computing device to display, to the first user, a graphical user interface (GUI) associated with the at least one communication, wherein the GUI comprises at least one GUI element, notifying to the first user that the second user is associated with the particular delivery portion of the particular transaction that is associated with the particular entity.

13. The system of claim 12, wherein the trained call verification machine learning model is further trained to determine the time window; and wherein to determine a particular time window based at least in part on the indication of the at least one communication comprises to:
utilize the trained call verification machine learning model to determine the particular time window.

14. The system of claim 12, wherein the trained call verification machine learning model is further trained to determine a first likelihood metric, identifying that the phone number is associated with the entity associated with fulfilling user transactions.

15. The system of claim 12, wherein to utilize the trained call verification machine learning model to determine when the second user is associated with the particular delivery portion of the particular transaction further comprises to:
utilize the trained call verification machine learning model to determine a second likelihood metric, identifying that the second user is associated with the particular delivery portion of the particular transaction;
wherein the at least one GUI element is further configured to notify the first user of the second likelihood metric.

16. They system of claim 12, wherein the at least one GUI element is further configured to notify the first user of at least one of: transaction information of the particular transaction, or entity information of particular entity.

17. The system of claim 12, wherein the particular time window is subsequent to the particular transaction being completed with the particular entity.

18. The system of claim 12, wherein the particular time window is prior to the particular transaction being completed with the particular entity.

19. The system of claim 12, wherein the at least one communication comprises one or more of: a phone call, an SMS message, an MMS message, an email, a voice message, a chat message, or a social media message.

20. A computing device comprising:
a non-transient computer memory, storing software instructions; and
at least one processor;
wherein, when the at least one processor executes the software instructions, the computing device is programmed to:
receive, from the computing device, an indication of at least one communication being received from a second user, wherein the at least one communication is associated with a particular phone number;
receive, transaction information of a particular transaction associated with the first user and a particular entity, wherein the particular transaction is to be delivered at a future point of time by a particular service provider;
determine, a particular time window based at least in part on the indication of the at least one communication;
utilize a trained call verification machine learning model to determine, based at least in part on the transaction information and the indication of the at least one communication, that the second user is the particular service provider that is associated with a delivery portion of the particular transaction associated with the particular entity; and
instruct, when the second user is associated with the delivery portion of the particular transaction and when the future point of time is within the particular time window, the computing device to display, to the first user, a graphical user interface (GUI) associated with the at least one communication, wherein the GUI comprises at least one GUI element, notifying to the first user that the second user is associated with the delivery portion of the particular transaction that is associated with the particular entity.

* * * * *